(12) United States Patent
Idicula et al.

(10) Patent No.: US 10,503,626 B2
(45) Date of Patent: Dec. 10, 2019

(54) HYBRID INSTRUMENTATION FRAMEWORK FOR MULTICORE LOW POWER PROCESSORS

(71) Applicant: Oracle International Corporation, Redwood Shores, CA (US)

(72) Inventors: Sam Idicula, Santa Clara, CA (US); Kirtikar Kashyap, Redwood City, CA (US); Arun Raghavan, Belmont, CA (US); Evangelos Vlachos, San Francisco, CA (US); Venkatraman Govindaraju, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/882,108

(22) Filed: Jan. 29, 2018

(65) Prior Publication Data

US 2019/0235985 A1    Aug. 1, 2019

(51) Int. Cl.
  *G06F 9/44*   (2018.01)
  *G06F 9/38*   (2018.01)
  (Continued)

(52) U.S. Cl.
  CPC ...... *G06F 11/3466* (2013.01); *G06F 11/0751* (2013.01); *G06F 11/3024* (2013.01);
  (Continued)

(58) Field of Classification Search
  CPC .. G06F 9/5016; G06F 9/30145; G06F 9/3806; G06F 11/3466; G06F 11/0751;
  (Continued)

(56) References Cited

U.S. PATENT DOCUMENTS

| | | | | |
|---|---|---|---|---|
| 5,926,639 A | * | 7/1999 | Richardson | G06F 8/433 714/E11.209 |
| 7,770,140 B2 | * | 8/2010 | Bell | G06F 11/3457 716/101 |

(Continued)

OTHER PUBLICATIONS

Tyler Sondag et al., Predective thread-to-core assignment on a heterogeneous multi-core processor, Oct. 18, 2007, [Retrieved on Aug. 4, 2019]. Retrieved from the internet: <URL: http://delivery.acm.org/10.1145/1380000/1376799/a7-sondag.pdf> 5 Pages (1-5) (Year: 2007).*

(Continued)

*Primary Examiner* — Anibal Rivera
(74) *Attorney, Agent, or Firm* — Hickman Palermo Becker Bingham LLP; Brian N. Miller

(57) ABSTRACT

Techniques are provided for redundant execution by a better processor for intensive dynamic profiling after initial execution by a constrained processor. In an embodiment, a system of computer(s) receives a request to profile particular runtime aspects of an original binary executable. Based on the particular runtime aspects and without accessing source logic, the system statically rewrites the original binary executable into a rewritten binary executable that invokes telemetry instrumentation that makes observations of the particular runtime aspects and emits traces of those observations. A first processing core having low power (capacity) performs a first execution of the rewritten binary executable to make first observations and emit first traces of the first observations. Afterwards, a second processing core performs a second (redundant) execution of the original binary executable based on the first traces. The second execution generates a detailed dynamic performance profile based on the second execution.

20 Claims, 9 Drawing Sheets

(51) Int. Cl.
*G06F 9/50* (2006.01)
*G06F 17/50* (2006.01)
*G06F 11/34* (2006.01)
*G06F 11/30* (2006.01)
*G06F 11/07* (2006.01)
*G06F 11/36* (2006.01)
*G06F 9/30* (2018.01)

(52) U.S. Cl.
CPC ...... *G06F 11/3457* (2013.01); *G06F 11/3692* (2013.01); *G06F 9/30145* (2013.01); *G06F 9/3806* (2013.01); *G06F 9/5016* (2013.01)

(58) Field of Classification Search
CPC .... G06F 11/3692; G06F 21/577; G06F 8/433; G06F 8/4441; G06F 8/456; G06F 8/52; G06F 9/30; G06F 9/45; G06F 9/455; G06F 17/50; G06F 11/34; G06F 8/41; G06F 8/71; G06F 8/4442; G06F 9/3009; G06F 9/45516; G06F 17/5045; G06F 21/52

See application file for complete search history.

(56) References Cited

U.S. PATENT DOCUMENTS

| | | | | |
|---|---|---|---|---|
| 7,844,928 | B2 * | 11/2010 | Bell | G06F 17/5022 716/133 |
| 7,904,870 | B2 * | 3/2011 | Bell, Jr. | G01R 31/318357 703/13 |
| 8,010,334 | B2 * | 8/2011 | Bell | G01R 31/318357 703/13 |
| 8,510,724 | B2 * | 8/2013 | Levanoni | G06F 8/53 717/136 |
| 8,522,225 | B2 * | 8/2013 | Chen | G06F 8/433 717/133 |
| 8,782,381 | B2 * | 7/2014 | Chen | G06F 9/3806 712/233 |
| 8,799,884 | B2 * | 8/2014 | Dreyer | G06F 8/52 712/203 |
| 9,189,233 | B2 * | 11/2015 | Sasanka | G06F 9/30098 |
| 2004/0154011 | A1 * | 8/2004 | Wang | G06F 9/3009 717/158 |
| 2009/0300166 | A1 * | 12/2009 | Chen | G06F 11/3466 709/224 |
| 2010/0287536 | A1 * | 11/2010 | Chung | G06F 8/443 717/128 |
| 2010/0299657 | A1 * | 11/2010 | Barua | G06F 8/456 717/136 |
| 2010/0306746 | A1 * | 12/2010 | Barua | G06F 8/52 717/136 |
| 2011/0066829 | A1 * | 3/2011 | Tye | G06F 8/4441 712/226 |
| 2011/0167416 | A1 * | 7/2011 | Sager | G06F 8/4442 717/149 |
| 2011/0231824 | A1 * | 9/2011 | Chabbi | G06F 11/0751 717/126 |
| 2012/0198169 | A1 * | 8/2012 | Chen | G06F 9/3806 711/125 |
| 2012/0266150 | A1 * | 10/2012 | North | G06F 9/30145 717/168 |
| 2013/0125097 | A1 * | 5/2013 | Ebcioglu | G06F 17/5045 717/136 |
| 2013/0132690 | A1 * | 5/2013 | Epstein | G06F 12/1416 711/159 |
| 2013/0166886 | A1 * | 6/2013 | Sasanka | G06F 9/30098 712/216 |
| 2014/0156972 | A1 * | 6/2014 | Shanbhogue | G06F 9/30145 712/205 |
| 2014/0201477 | A1 * | 7/2014 | Greenfield | G06F 9/5016 711/158 |
| 2015/0135313 | A1 * | 5/2015 | Wesie | G06F 9/445 726/22 |
| 2015/0143452 | A1 * | 5/2015 | Hamlen | G06F 21/51 726/1 |
| 2015/0234736 | A1 * | 8/2015 | Koju | G06F 11/3692 717/131 |
| 2016/0119137 | A1 * | 4/2016 | Sethumadhavan | G06F 12/0897 713/190 |
| 2016/0188372 | A1 * | 6/2016 | Sarkar | G06F 9/45516 718/103 |
| 2017/0024191 | A1 * | 1/2017 | Esliger | G06F 8/41 |
| 2017/0103210 | A1 * | 4/2017 | Baji-G L | G06F 21/577 |
| 2017/0337227 | A1 * | 11/2017 | Abraham | G06F 3/0482 |
| 2017/0344349 | A1 * | 11/2017 | He | G06F 11/3466 |
| 2018/0211046 | A1 * | 7/2018 | Muttik | G06F 21/577 |
| 2018/0247069 | A1 * | 8/2018 | Tang | G06F 21/52 |
| 2019/0043457 | A1 * | 2/2019 | Hong | G09G 5/39 |

OTHER PUBLICATIONS

Derek Bruening et al., An Infrastructure for Adaptive Dynamic Optimization, 2003 IEEE, [Retrieved on Aug. 4, 2019]. Retrieved from the internet: <URL: https://ieeexplore.ieee.org/stamp/stamp.jsp?tp=&arnumber=1191551> 11 Pages (1-11) (Year: 2003).*

Xu et al., "A Flight Data Recorder for Enabling Full-system Multiprocessor Deterministic Replay", 30th Annual International Symposium on Computer Architecture San Diego, CA, Jun. 2003, 12 pgs.

Staats et al., "Parallel Symbolic Execution for Structural Test Generation", ISSTA'10, Jul. 12-16, 2010, Trento, Italy, 11 pages.

Sorin, "SafetyNet: Improving the Availability of Shared Memory Multiprocessors with Global Checkpoint/Recovery", dated May 2002, 14 pages.

Sheehy, Justin, "Why Vector Clocks Are Hard", Basho Blog, dated Apr. 5, 2010, 14 pages.

Roy et al., "Hybrid Binary Rewriting for Memory Access Instrumentation", VEE'11, Mar. 9-11, 2011, Newport Beach, California, USA, 12 pages.

Luk, et al., "Pin: Building Customized Program Analysis Tools with Dynamic Instrumentation", PLDI'05 Jun. 12-15, 2005,Chicago,Illinois,USA, 11 pages.

LeGendre, Matthew, "Dyninst as a Binary Rewriter", dated Apr. 2008, 23 pages.

Graham, "gprof: a Call Graph Execution Profiler" dated 1982, 10 pages.

Bach et al., "Analyzing Parallel Programs with Pin", Computer, Published by the IEEE Computer Society, dated 2010, 8 pages.

"Linux/UNIX System Programming Training", dated Aug. 14, 2107, 12 pages, http://man7.org/linux/man-pages/man1/gcov.1.html.

Liu et al., "ad-heap: an Efficient Heap Data Structure for Asymmetric Multicore Processors", In Proceedings of Workshop on General Purpose Processing Using GPUs, ACM, dated 2014, 10 pages.

LaMarca et al., "The Influence of Caches on the Performance of Heaps", dated Jan. 1, 1996, 26 pages.

Furtak et al., "Using SIMD Registers and Instructions to Enable Instruction-Level Parallelism in Sorting Algorithms", ACM Symposium on Parallel Algorithms and Architectures, dated 2007, 10 pages.

D.E. Knuth, "The Art of Computer Programming", vol. 3: 2nd Edition Sorting and Searching, ISBN: 0-201-03803-X, pp. 129-157 from book, dated 1973.

C. Balkesen et al.. "Main-memory hash joins on multi-core CPUs: Tuning to the underlying hardware," 2013 IEEE 29th International Conference on Data Engineering, pp. 362-373.

Begley et al. "MCJoin: A Memory-constrained Join for Column-Store Main-memory Databases", dated 2012, ACM SIGMOD International Conference on Management of Data (SIGMOD '12), pp. 121-132.

* cited by examiner

HYBRID INSTRUMENTATION FRAMEWORK FOR MULTICORE LOW POWER PROCESSORS

FIELD OF THE DISCLOSURE

This disclosure relates to software profiling. Presented herein are techniques for redundant execution by a better processor for intensive dynamic profiling after initial execution by a constrained processor.

BACKGROUND

Instrumentation is a technique for program analysis tasks such as profiling, performance evaluation, and bottleneck analysis, and for software engineering tasks such as bug detection, enforcing application programming interface (API) compliance, and finding hot logic and dead logic. Due to runtime overhead, performance evaluation may slow program execution, which may distort execution timing, which may cause concurrency malfunctions such as race conditions. For concurrent programs, an exact ordering of events may be preserved, which may further slow program execution but facilitates debugging race conditions or other dynamic conditions.

Instrumentation can be done at various stages: statically at compile/link time or dynamically at runtime. Instrumentation frameworks may cause extra logic to be inserted and executed along with an application to monitor and observe behavior of the application. Existing instrumentation frameworks can be either static or dynamic.

With static instrumentation, the compiler inserts extra logic to instrument an application at compile time or at link time. Examples include gprof and gcov functionalities in the gNU ("not Unix") compiler collection (GCC). Another way to statically instrument the application is to use a binary rewriter to rewrite the application after the full application is built. Some of the advantages that come with static instrumentation tools are low runtime overhead and a more optimized instrumented binary owing to the additional information available at compile time or link time. However, there are several limitations to that approach and, although the compiler has more information about what and where to instrument, that approach requires the entire source code for an application including system libraries to be compiled by the compiler. Similarly, binary rewriters also need to rewrite shared system libraries, which does not scale for multiple tools using a same profiling framework.

With dynamic instrumentation, a tool or driver inserts extra logic into an application at runtime. This approach usually does not require source code for application or library to instrument the application since it works with running code directly. However, since dynamic instrumentation works at runtime, it does not have full information about the running program (because building was somewhat lossy) and must work at an instruction sequence level, which is very invasive. Dynamic instrumentation also requires an additional process to monitor and instrument the running program. Dynamic instrumentation may disturb or destroy the concurrency of the running program because the instrumentation logic is typically executed sequentially.

Since inserting extra logic into an application hurts performance, dynamic instrumentation frameworks are typically implemented using a JIT (Just-In-Time) compiler. Intel's Pin is one such framework. Pin is a popular dynamic instrumentation framework for general purpose programming environment that JITs X86 binary logic as it inserts instrumentation logic during the runtime. Although Pin is a dynamic instrumentation framework, it is infeasible for low power (capacity) embedded processors since JIT requires too much processing power. In particular, Pin and similar dynamic instrumentation frameworks have several drawbacks for low power embedded processors:

Virtual Memory/Process abstraction Requirement: Pin requires at least two execution processes and support from the operating system to implement various functionalities.

Memory Requirement: Since all instructions are instrumented by Pin, and Pin stores all the instrumented instructions in memory for efficiency, too much memory is needed. This might not be a problem for some systems or servers but poses a serious limitation for memory-constrained systems.

Compute Requirement: Pin requires a powerful processor since the JIT runs on the same processor as the application and is very compute heavy. Running JIT on a low power, embedded processor interferes with the application execution itself and is infeasible.

Not scalable to multi-core systems: Since the logic cache and instrumentation logic run sequentially in different processes and memory spaces, parallelism in the application is compromised and/or corrupted.

DETAILED DESCRIPTION

Figure 1:
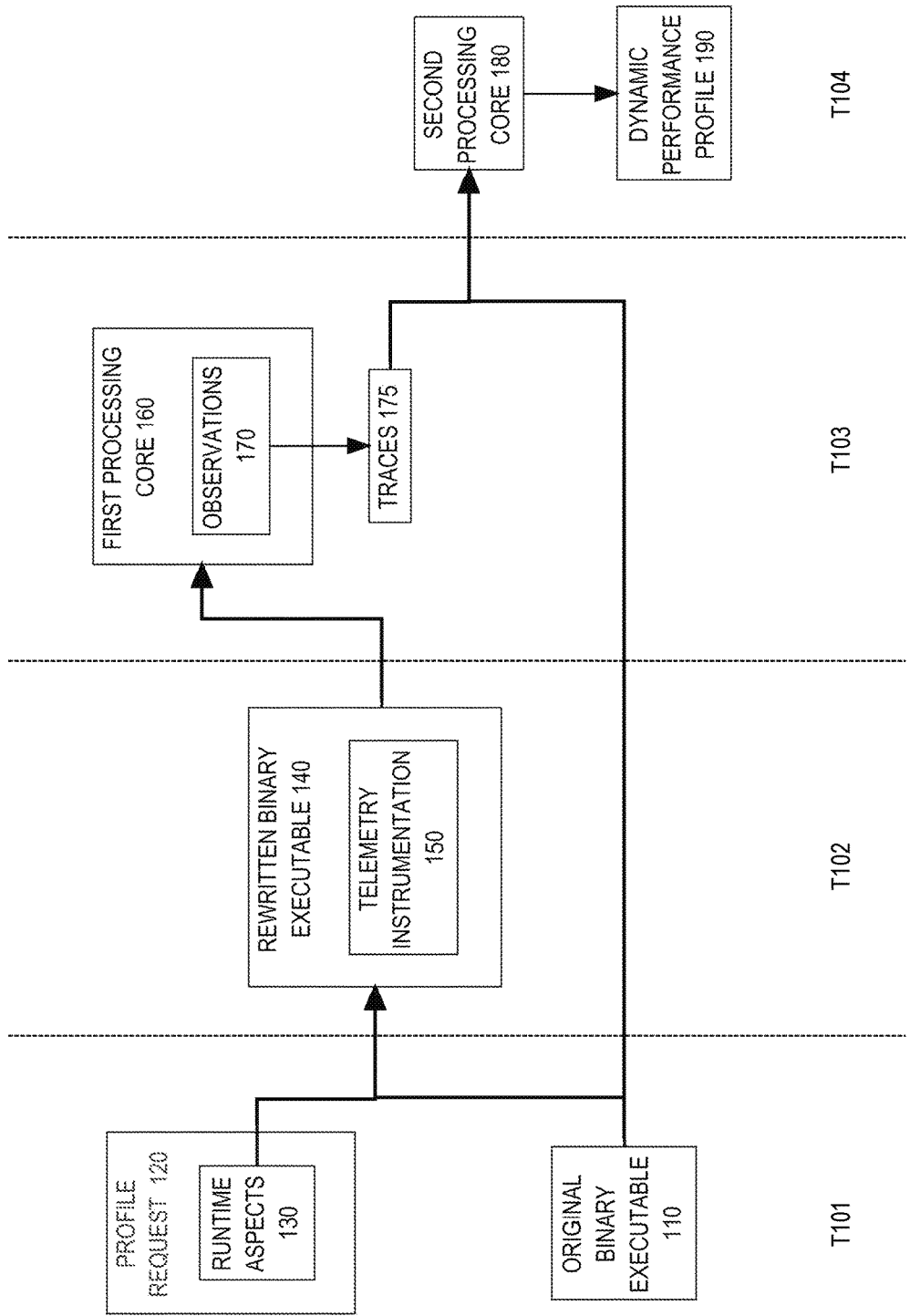
FIG. 1 is a block diagram that depicts an example computer system that uses redundant execution by a better processor for intensive dynamic profiling after initial execution by a constrained processor, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer System
   2.1 Heterogeneous Processing Cores
   2.2 Constrained Embedded Application
   2.3 Diagnostic Phases
   2.4 Binary Rewriting
   2.5 Tracing
   2.6 Instrumentation
   2.7 Redundant Execution
3.0 Example Redundant Execution Process
   3.1 Instrumenting
   3.2 First Execution
   3.3 Second Execution
4.0 Concurrency
   4.1 Partial Ordering
5.0 Emulation
   5.1 Granularity
   5.2 Flow Control
6.0 Relocation
   6.1 Address Translation
7.0 Self-Modifying Logic
   7.1 Computed Address
8.0 Embedded Device, Internet Of Things
9.0 Hardware Overview
10.0 Software Overview
11.0 Cloud Computing 1.0 General Overview Techniques are provided for redundant execution by a better processor for intensive dynamic profiling after initial execution by a constrained processor. In an embodiment, a system of computer(s) receives a request to profile particular runtime aspects of an original binary executable. Based on the particular runtime aspects and without accessing source logic, the system statically rewrites the original binary executable into a rewritten binary executable that invokes telemetry instrumentation that makes observations of the particular runtime aspects and emits traces of those observations. A first processing core having low power (capacity) performs a first execution of the rewritten binary executable to make first observations and emit first traces of the first observations. Afterwards, a second processing core performs a second (redundant) execution of the original binary executable based on the first traces. The second execution generates a detailed dynamic performance profile based on the second execution.

The dynamic performance profile contains enough recorded events regarding the second execution to eventually perform more or less complicated analysis of the behavior of the second execution. That analyzed behavior may be imputed to (used as a proxy for) an unavailable (non-existent) performance profile of the first execution. For example if the second execution leaked memory, then supposedly (in the absence of direct evidence) the first execution also leaked memory (and in exactly the same way). Thus, problems and other interesting phenomena can be detected for the first processing core even though that constrained core lacks sufficient capacity for intensive dynamic profiling. Thus, inconvenient additional hardware such as an in-circuit emulator (ICE) is unnecessary to obtain a detailed dynamic performance profile that accurately reflects the performance of the constrained first processing core. Herein, embodiments having various granularity of traces, various emulation features, and various deployment topologies are described.

2.0 Example Computer System

FIG. 1 is a block diagram that depicts an example computer system 100, in an embodiment. Computer system 100 uses redundant execution by a better processor for intensive dynamic profiling after initial execution by a constrained processor. Computer system 100 contains processing cores 160 and 180 that may reside (although not shown) in a same chip, on a same circuit board, in a same computer, or on separate computers. Each computer may be an embedded computer, a personal computer, a rack server such as a blade, a mainframe, a virtual machine, or any computing device.

2.1 Heterogeneous Processing Cores

Each of processing cores 160 and 180 may each be a microprocessor, an internal processing core of a central processing unit, a microcontroller, a digital signal processor, or other programmable component that processes machine instructions for data and control. Processing cores 160 and 180 may differ in capability, capacity, energy consumption, bandwidth, throughput, clock speed, data rate, or instruction rate. Thus, processing cores 160 and 180 may be heterogeneous in both circuitry and performance.

First processing core 160 may be performance constrained. For example, first processing core 160 may be designed to sacrifice performance for low energy consumption. For example, first processing core 160 may be embedded in a mobile device that has limited available power, such as from a constrained power source such as a battery or a photovoltaic cell that is undersized due to a design factor such as miniaturization or manufacturing cost. Indeed, first processing core 160 may lack an onboard power source and instead use a limited environmental power source such as electromagnetic, thermal, or mechanical energy. In an embodiment, first processing core 160 is designed for low power consumption to reduce heat dissipation for special applications such as wearable computing or remote sensing. In an embodiment, first processing core 160 is designed for miniaturization for high density such as for horizontal scalability within a set of co-processors that support a central processor in a same integrated circuit (i.e. semiconductor chip).

Whereas, second processing core 180 may have more capability than first processing core 160. For example, second processing core 180 may consume more power and achieve higher performance. For example, second processing core 180 may be general purpose. In an embodiment, first processing core 160 is a co-processor, and second processing core 180 is a central processor on a same chip. For example, a central processing unit (CPU) chip may have more first processing cores 160 than second processing core(s) 180.

2.2 Constrained Embedded Application

First processing core 160 may execute an embedded software application, such as a computer program, that is encoded as a codebase of machine instructions, such as binary executable 110 or 140. For example, an embedded software application may be downloaded onto an embedded computer (that contains first processing core 160) to configure the embedded computer into a dedicated machine that primarily operates according to the embedded software application. For example, first processing core 160 may be embedded in a mobile internet of things (IoT) device such as a remote sensor. Whereas, second processing core 180 may be part of a remote server computer. Alternatively, processing cores 160 and 180 may be more or less integrated within a same computer.

Due to a nature of an application, an embedded software application may operate under various timing constraints such real-time deadlines of various degrees (e.g. hard, firm, or soft) due to various reasons such as sensing, kinematics, or human perception and user experience (UX). Such timing constraints may be aggravated by the constrained performance of first processing core 160, such that the embedded software application should be streamlined for performance. For example, the embedded software application may malfunction if burdened with ancillary software responsibilities such as logging, profiling, or other diagnostic activity, that disturbs the execution timing of the embedded software application. For example, a race condition may arise if the embedded software application is multithreaded and overburdened.

Thus, first processing core 160 should not be expected to perform all of the diagnostic roles that second processing core 180 may readily perform. For example, second processing core 180 may have a sufficient instruction rate and/or data rate to perform extensive dynamic profiling of application software execution. Whereas, first processing core 160 may be unable to perform extensive dynamic profiling due to drag (overhead) that dynamic profiling entails. Thus for first processing core 160, performance may be observed (profiled), or performance may be successful, but not both. To compensate for that, computer system 100 is designed to offload some performance profiling activity from first processing core 160 to second processing core 180 in a way that is sufficient to more or less protect the timing and performance of first processing core 160. To accomplish profiling without impacting timing, computer system 100 may operate according to diagnostic phases as follows.

2.3 Diagnostic Phases

FIG. 1 has vertical dashed lines that separate time bands that occur sequentially from time T101 to T104. For example, T101 occurs before T102. Thus, FIG. 1 provides an example timeline for interactions amongst the components of computer system 100.

In operation and initially at time T101, computer system 100 receives profile request 120 to profile the execution of original binary executable 110 on first processing core 160. Profile request 120 contains runtime aspects 130 that may be one or more dynamic and observable attributes that arise from the execution of a binary executable such as 110 or 140. The following are examples of dynamic aspects of program execution that may be profiled: heap or code reachability, heap or stack corruption, cache thrashing or coherency, buffer overflow, bus usage, pointer validity, machine instruction usage, subroutine call flow, control or data flow, latency, throughput, processing load, idleness, logical constraint compliance, and codebase hot spots. However, first processing core 160 may lack capacity sufficient to monitor and analyze such dynamic aspects.

2.4 Binary Rewriting

At time T102, computer system 100 reacts to profile request 120 by rewriting (analyzing and instrumenting) original binary executable 110 to generate rewritten binary executable 140 that is semantically equivalent to 110. Semantic equivalence means that first processing core 160 may execute either binary executable 110 or 140 to achieve same behaviors. However, binary executables 110 and 140 are not precisely identical. Rewritten binary executable 140 contains telemetry instrumentation 150 that, with minimal performance impact, makes limited observations about the live execution of rewritten binary executable 140 on a processing core such as 160. Telemetry instrumentation 150 includes subroutines and data structures that operate as centralized and reusable mechanisms for limited profiling. Telemetry instrumentation 150 also includes machine instructions that are inserted adjacent to (or replacing) original machine instructions that are more or less copied from binary executable 110 into 140. Inserted machine instructions may include callback hooks that invoke subroutines within telemetry instrumentation 150.

2.5 Tracing

For example, original binary executable 110 may allocate an object in a heap by invoking one heap subroutine that allocates the object and returns the memory address of the object. Later, original binary executable 110 may deallocate the object passing the memory address of the object to a deletion subroutine. Telemetry instrumentation 150 may help detect one kind of heap corruption by replacing invocations of those heap subroutines with invocations of corresponding wrapper routines that: a) invoke the corresponding heap subroutine, and b) log the memory address allocated or deallocated. Thus at time T103, first processing core 160 may execute rewritten binary executable 140 to make observations (such as 170) of dynamic behavior (such as heap activity). First processing core 160 may encode and emit observations 170 as traces 175. For example, traces 175 may be spooled to a local or remote file or streamed (continuously or in batches) through a communication socket or pipe for additional processing.

Here the term "trace" means an encoded observed event that is suitable for transmission and recording, such as for eventual consumption by an external agent, such as second processing core 180. In an embodiment, a trace additionally contains one or more machine instructions that were actually executed or program counter values for those machine instructions that were executed at or near the time of observations 170. For example, if runtime aspects 130 requests subroutine call tracing, then whenever any or particular subroutines are entered or exited, an additional observation of that event is appended to observations 170 and traces 175, where that traced event may include a reference to the subroutine, such as its identifier or memory address, and either a value of the program counter that invoked the subroutine, or a value of the program counter where the subroutine exited (returned).

Observations 170 and traces 175 need not be directly related to a performance problem, such as corruption. For example, although runtime aspects 130 may implicate heap monitoring, telemetry instrumentation 150 may monitor additional activity that may seem to have little or no direct relevance to runtime aspects 130. For example, telemetry instrumentation 150 may also capture observations 170 and emit traces 175 that regard seemingly unrelated dynamics such as timing and/or intercommunication of multiple execution threads or call graph activity such as subroutine entry and exit. Thus, subsequent analysis of traces 175 may interpret various events within traces 175 as conceptual checkpoints or milestones from which a partial ordering of surrounding events may be detected. For example, binary executables 110 and 140 may be multithreaded for symmetric multiprocessing (SMP) on a multicore computer having several constrained cores such as 160. Each constrained core may concurrently execute a respective thread to achieve coarse grained parallelism. Traces 175 may reveal (at a more or less high level) for a given moment in time which distributed processing activities have finished, which have not yet begun, and which are ongoing.

2.6 Instrumentation

Runtime aspects 130 is significant in part because they focus telemetry instrumentation 150 on particular codebase portions or features that are of interest when profile request 120 is submitted. For example, original binary executable 110 may preexist profile request 120. Thus, original binary executable 110 may be repeatedly profiled in different ways according to different profile requests. Because fulfilling each profile request (such as 120) may entail creation of a separate rewritten binary executable (such as 140), telemetry instrumentation (such as 150) may be different for each profile request (and in each rewritten binary executable). Thus, telemetry instrumentation 150 may entail rewriting of only portions of a binary executable and may entail inclusion of only a subset of reusable central mechanisms. Thus, telemetry instrumentation 150 may be lean and far from exhaustive. For example, telemetry instrumentation 150 need not be applied to an entire codebase.

For example, if heap usage is a sole concern, then only a heap subsystem (e.g. library) need be instrumented with additional instructions. Likewise if cache coherency is a sole concern, then only memory access needs instrumentation, or even perhaps only memory barriers need instrumentation. Thus, telemetry instrumentation 150 may be narrowly tailored for particular runtime aspects 130 in ways that eager (e.g. compile time or otherwise before profile request 120) instrumentation would not achieve. Thus, telemetry instrumentation 150 may preserve execution timing in cases where eager or general (pervasive) instrumentation would distort or destroy expected execution timing. Likewise, telemetry instrumentation 150 may have a smaller codebase and consume less scratch memory than general instrumentation.

Telemetry instrumentation 150 may also have less responsibility than other instrumentation techniques, which yields additional time and space savings. General instrumentation typically may be fine grained and need to monitor the execution of many or most machine instructions for a variety of issues. Whereas, observations 170 and traces 175 need not necessarily even regard issues that are designated in runtime aspects 130. For example, observations 170 ideally include only data that regards concurrency timing (e.g. synchronization, intercommunication, memory fencing). Thus ideally, observations 170 include only synchronization points that can later be used for recovering contours of parallelism that actually occurred.

For example, observations 170 need not include heap access even though runtime aspects 130 indicate a heap concern. That is because first processing core 160 does not perform a sole execution of a binary executable and thus is not a sole source of dynamic profiling data.

2.7 Redundant Execution

Processing cores 160 and 180 have overlapping or identical instruction sets. Thus, a binary executable may contain machine instructions that can be executed by both processing cores 160 and 180. In an embodiment, the instruction set of processing core 180 is a superset (has additional instructions) of the instruction set of 160. In an embodiment, processing core 180 has a bigger register file (more general purpose registers) than 160. Due to a shared instruction set, redundant execution is possible, such that a binary executable may execute twice: first with rewritten binary executable 140 on first processing core 160 at time T103 and then again with original binary executable 110 on second processing core 180 at time T104.

The insertion of instrumentation instructions (e.g. hooks) into an existing sequence of machine instructions may cause demand for general purpose registers to exceed the constrained register file of first processing core 160. Thus, binary rewriting may entail register scavenging, which is temporary repurposing of allocated general purpose registers in an attempt to avoid some register spilling at runtime.

The granularity of traces 175 (and their encoded synchronization points) depends on telemetry instrumentation 150 (and runtime aspects 130). For example, each subroutine call or return may generate a traced observation of coarse granularity. Alternatively, a lexical block such as a basic block (uninterrupted sequence of a few machine instructions having a single entry and single exit) may generate a traced observation having medium granularity. Fine granularity, such as a trace for each machine instruction, is undesirable due to drag. Other beneficial traceable synchronization points include memory barriers or fences, input/output (I/O), or cache line activity (hit, miss, invalidate, evict, write back). Thus, second processing core 180 may analyze traces 175 to reconstruct a (at least partial) call graph, control flow graph, or data flow graph.

Actual parallelism may naturally be different: a) between binary executables 110 and 140 because only 140 has telemetry instrumentation 150, and b) between processing cores 160 and 180 because of hardware differences. Second processing core 180 may use any reconstructed call graph, control flow graph, or data flow graph to superimpose additional constraints upon the second execution to better match the actual behavior of the first execution. For example, various multithreading issues such as race conditions may arise that may jeopardize the ability of second processing core 180 to effectively execute a binary executable in a same way as first processing core 160 did. Origins, implications, and compensation of such divergent parallelism between first and second executions are further discussed later for FIG. 3.

In any case, second processing core 180 has advantages that make a redundant (second) execution well suited for intensive execution profiling to create detailed dynamic performance profile 190. One advantage is that second processing core 180 has traces 175 and increased capacity for accurate execution. Another advantage is that second processing core 180 may perform intensive dynamic profiling during execution. By design, executing telemetry instrumentation 150 should need less processing power than generating dynamic performance profile 190 needs. Thus, techniques herein may achieve intensive performance profiling that resource-constrained first processing core 180 cannot achieve.

Dynamic performance profile 190 may contain execution data (e,g, runtime performance measurements and event logs) that are sufficient input for performing thorough analysis of: a) hot logic having an execution frequency that exceeds a threshold, b) dead logic that is not executed, c) logic that violates cache coherency, d) a memory leak, e) an invalid memory access, or f) logic that violates a constraint of an application programming interface (API). For example, a constraint may be defined for a subroutine or data structure as a precondition, a postcondition, or an invariant.

3.0 Example Redundant Execution Process

Figure 2:
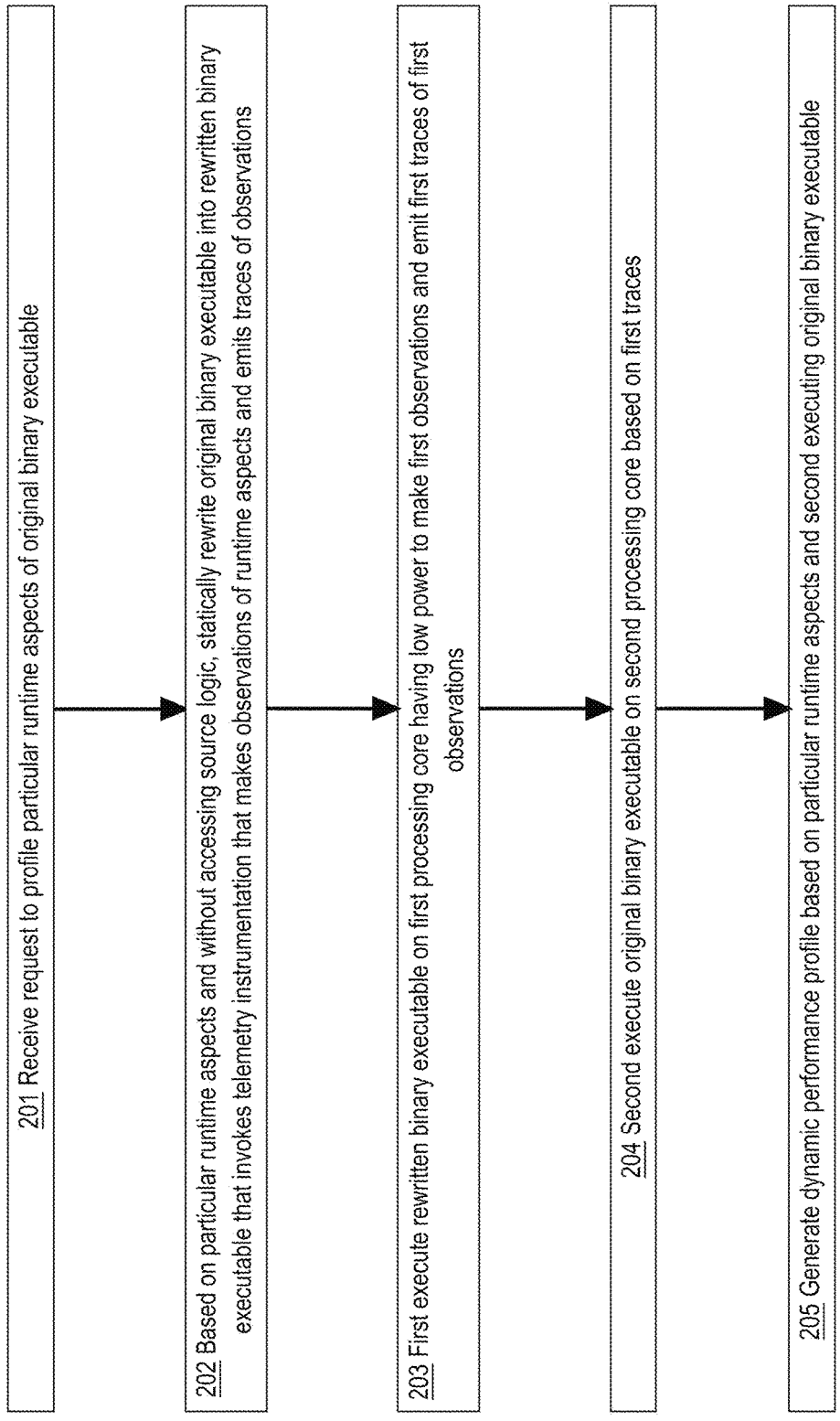
FIG. 2 is a flow diagram that depicts an example process for a redundant execution by a better processor for intensive dynamic profiling after initial execution by a constrained processor, in an embodiment.

FIG. 2 is a flow diagram that depicts computer system 100 performing an example process for using a redundant execution by a better processor for intensive dynamic profiling after initial execution by a constrained processor, in an embodiment. Thus, FIG. 2 is discussed with reference to FIG. 1.

3.1 Instrumenting

Steps 201-202 are preparatory. In step 201, a request to profile particular runtime aspects of an original binary executable is received. For example, a test engineer may submit profile request 120 that includes runtime aspects 130 that specify profiling for memory leaks and buffer overflows. Profile request 120 may identify any of: binary executable 110 and/or 140, processing core 160 and/or 180, particular computer(s) of computer system 100, and a file path to store dynamic performance profile 190.

In step 202, based on the particular runtime aspects and without accessing source logic of the original binary executable, the original binary executable is rewritten into a rewritten binary executable that invokes telemetry instrumentation that makes observations of the particular runtime aspects and emits traces of the observations. For example, original binary executable 110 may lack debug information and/or a symbol table.

Figure 4:
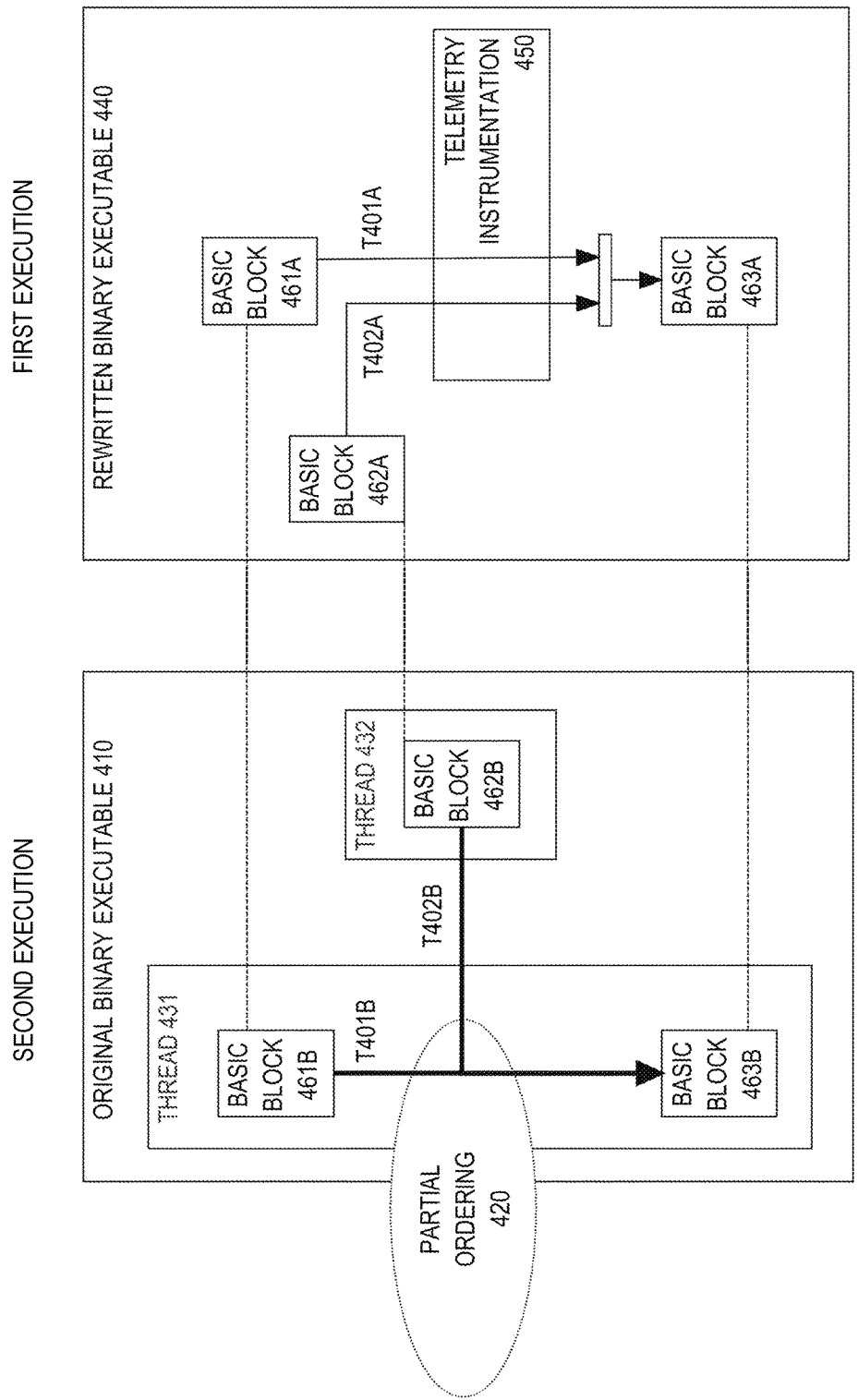
FIG. 4 is a block diagram that depicts an example computer that dispatches naturally occurring basic blocks as units of work in a second execution according to a partial ordering that is inferred from a first execution, in an embodiment.

Original binary executable 110 may be analyzed to detect structural elements such as static data, machine instruction sequences, subroutines, and or basic blocks (as explained for FIG. 4). Original binary executable 110 is rewritten based on runtime aspects 130 to create rewritten binary executable 140 that contains telemetry instrumentation 150 that may include reusable software infrastructure and entail insertion of additional machine instructions into original instruction sequences. Rewritten binary executable 140 may be downloaded onto particular computer(s) of computer system 100 for eventual first execution.

3.2 First Execution

In step 203, a first processing core having low capacity performs a first execution of the rewritten binary executable to make first observations and emit first traces of the first observations. For example, first processing core 160 executes rewritten binary executable 140 that causes telemetry instrumentation 150 to make dynamic performance observations 170 and emit 170 as traces 175. For example, first processing core 160 may use inter-process communication (IPC) to send traces 175 to second processing core 180. As explained for FIG. 3, observations 170 and traces 175 need not be exhaustive in scope. For example, only important concurrency synchronization events need be traced in some embodiments, with additional tracing for some use cases based on runtime aspects 130.

3.3 Second Execution

In step 204, based on the first traces, a second processing core replays (performs a second execution with) the original binary executable. For example, as explained later herein, second processing core 180 may analyze traces 175 to infer control flow or concurrency timing as a basis of timing and ordering constraints that may be superimposed upon the replay (second execution) with original binary executable 110.

Steps 204-205 concurrently occur. Whereas, arbitrary delays between steps 201-204 depend on the use case. In step 205, a dynamic performance profile is generated based on said particular runtime aspects and the second execution of the original binary executable. For example, the second execution may occur within an diagnostic harness that intensively observes the detailed behavior of the second execution. In an embodiment, the second execution occurs in a diagnostic virtual machine.

The second execution creates dynamic performance profile 190 that contains enough recorded events regarding the second execution to eventually perform more or less complicated analysis of the behavior of the second execution. That analyzed behavior may be imputed to (used as a proxy for) an unavailable (non-existent) performance profile of the first execution. For example if the second execution leaked memory, then supposedly (in the absence of direct evidence) the first execution also leaked memory (and in exactly the same way). Thus, problems and other interesting phenomena can be detected for first processing core 160 even though 160 lacks sufficient capacity for intensive dynamic profiling. Thus, inconvenient additional hardware such as an in-circuit emulator (ICE) is unnecessary to obtain a detailed dynamic performance profile that accurately reflects the performance of constrained first processing core 160.

4.0 Concurrency

Figure 3:
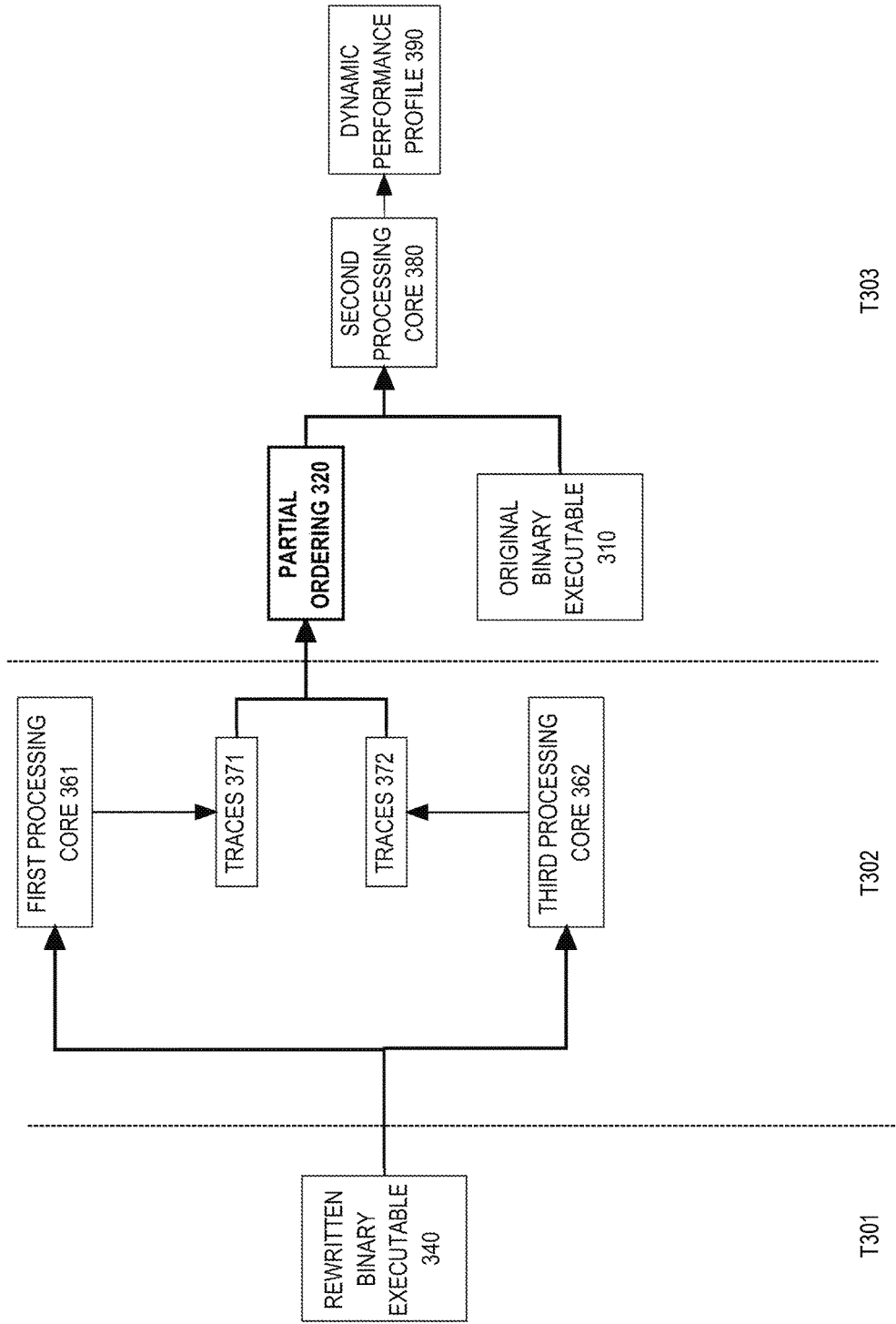
FIG. 3 is a block diagram that depicts an example computer that uses traces from multiple concurrent executions to superimpose a partial ordering of activities upon a subsequent redundant execution, in an embodiment.

FIG. 3 is a block diagram that depicts an example computer 300, in an embodiment. Computer 300 uses traces from multiple concurrent executions to superimpose a partial ordering of activities upon a subsequent redundant execution. Computer 300 may be an implementation of computer system 100. In particular, processing cores 361-362 and 380 are physically co-located. In an embodiment, each of processing cores 361-362 and 380 resides on a separate chip on a same circuit board. In another embodiment, processing cores 361-362 and 380 reside together within a same system on a chip (SoC).

Processing cores 361-362 are capacity constrained co-processors that may offload processing from second processing core 380 that has more capacity. Processing cores 361-362 and 380 may operate in parallel according to separate program counters (instruction streams) to achieve coarse grained parallelism. For example, rewritten binary executable 340 may have two concurrent execution threads and may be instrumented at time T301. During a first execution at time T302, processing cores 361-362 may each execute one of the two threads. During a second execution with original binary executable 310 at time T303, second processing core 380 may execute both threads.

Actual parallelism may naturally be different between first and second executions for a binary executable. Even multithreading of a uniprocessor in both executions may affect task ordering. Thus, race conditions may arise. Thus, first and second executions of a binary executable may functionally diverge. Thus, the first execution with rewritten binary executable 340 may succeed, and the second execution with original binary executable 310 may malfunction. Therefore, second processing core 380 may need to specially control the second execution to (at least partially) repeat the ordering of tasks that occurred in the first execution.

4.1 Partial Ordering

Thus at time T303, second processing core 380 should infer at least a partial ordering that occurred during the first execution. To accomplish that, second processing core 380 analyzes traces 371-372 to detect a partial ordering. Because the first execution used multiple constrained processing cores 361-362, such trace analysis may integrate multiple sets (371-372) of traces that encode synchronization points.

Second processing core 130 may analyze traces 371-372 to reconstruct a (at least partial) call graph, control flow graph, or data flow graph. In any case and at a minimum, second processing core 380 analyze traces 371-372 to infer partial ordering 320 that indicates that some activities indicated by some of traces 371-372 must have happened before, after, or concurrent to other activities indicated by other of traces 371-372. Ordering 320 is partial because it does not specify a relative ordering of all activities of traces 371-372. Thus, partial ordering 320 is not necessarily a total ordering of all traced activity, and second processing core 380 can tolerate a lack of a total ordering.

Thus, second processing core 380 may infer partial ordering 320 that occurred during a first execution. Second processing core 380 may impose that partial ordering upon a pending second execution. Thus, the first and second executions may be guaranteed to share at least a partial ordering of activity, according to 320. Thus, the second execution may achieve correct (consistent with first execution) semantics. Thus, redundant execution may be more or less high fidelity (i.e. actually repeatable). Thus, dynamic performance profile 390 may more or less accurately reflect a first execution, even though profile 390 is actually generated by a different execution on a different hardware element of computer 300.

5.0 Emulation

FIG. 4 is a block diagram that depicts an example computer 400, in an embodiment. Computer 400 dispatches naturally occurring basic blocks as units of work in a second execution according to a partial ordering that is inferred from a first execution. Computer 400 may be an implementation of computer system 100.

Original binary executable 410 specifies concurrent execution threads such as 431-432 that may be executed by separate processing cores or a same core (with context switching). Although not shown, rewritten binary executable 440 has similar corresponding threads that run more or less similar instruction streams as threads 431-432, although with additional telemetry instrumentation 450. However, faithfully repeating on a higher capacity processing core (not shown) the execution of a binary executable after execution on a lower capacity processing core may entail superimposing synchronization (trace) points, based on a partial ordering such as 420, upon instruction stream(s) of the second execution.

5.1 Granularity

What granularity (amount of instructions that separate consecutive synchronization points of a same instruction stream, i.e. thread) of a partial ordering is needed may depend on the application under test. For coarse granularity, call tracing may be sufficient, with telemetry instrumentation such as 450 having hooks to trace subroutine entry and/or exit. In an embodiment an instrumentation hook precedes or replaces, with an instruction sequence, an original subroutine invocation, with the memory address and original parameters of the original subroutine as parameters of the instrumentation hook.

For medium granularity, subroutines are too coarse, and basic blocks are more precise. A basic block is an uninterrupted sequence of machine instructions having a last instruction that sets a program counter, such as for a subroutine invocation, a conditional branch, or an unconditional jump. Thus, a basic block ends with a transfer of control to another (or same) basic block. Thus, basic blocks may form daisy chains, trees, and cycles that collectively form a control flow graph.

Telemetry instrumentation 450 may include a hook between each basic block. That hook may emit a trace that indicates when execution shifts from one basic block to another, such as from 461A to 463A at time T403A.

Rewritten binary executable 440 has threads (not shown) that correspond to threads 431-432. For example, a thread executes basic block 461A and then executes 463A, which corresponds to thread 431 executing basic block 461B and then 463B. In this example, there is a constraint on when basic block 463B may naturally execute. Basic block 463B should not execute until two events occur: a) a lock is released at time T402A by a first thread, and b) basic block 461A finishes at time 401A in a second thread. For example, basic blocks 461A and 462A run in separate threads, and 462A releases said lock. In theory, times 401A and 402A may occur in any order or simultaneously. Traces emitted by telemetry instrumentation 450 during the first execution may reveal in which order did times 402A and 403A actually occur.

5.2 Flow Control

Each of threads 431-432 executes basic blocks in sequence during the second execution. For example, thread 431 executes basic block 461B first and then executes 463B. Rewritten basic blocks 461B, 462B, and 463B correspond (shown as dashed lines) to original basic blocks 461A, 462A, and 463A. Basic blocks 461B, 462B, and 463B are shown as connected by a three-way arrow (shown bold) that indicates that basic block 463B should not execute until thread 432 releases said lock at time T402B and basic block 461B finishes at time T401B as indicated by said traces of the first execution. Thus, the three-way arrow indicates that a trace synchronization point from the first execution contributes to partial ordering 420 that may be superimposed upon the second execution. The ordering is partial because either of basic blocks 461B or 462B may start and/or finish first. However, basic block 463B should start last, although perhaps finishing before basic block 462B finishes.

Although not shown, the second execution with original binary executable 410 may occur within a diagnostic harness for intensive performance profiling. That diagnostic harness may also exert control over threads 431-432, such as to superimpose partial ordering 420. How the harness behaves may depend on a use case. For example, whether or not the harness imposes partial ordering 420 onto the executions of basic blocks 461B, 462B, and 463B may depend on the use case. If exposure of latent race conditions is desired, then the harness need not impose partial ordering 420 (for experimental purposes) to discover various emulation orderings that may cause a malfunction.

If a hidden race condition is not a concern, then the harness should impose partial ordering 420 to investigate another concern. In that case and regardless of which of times T401B and T402B occurs first, the harness will not execute basic block 463B until both T401B and T402B occur. If T401B occurs first, then the harness should suspend thread 431 until T402B occurs. Whereas if T402B occurs first, then no such suspension is needed.

6.0 Relocation

Figure 5:
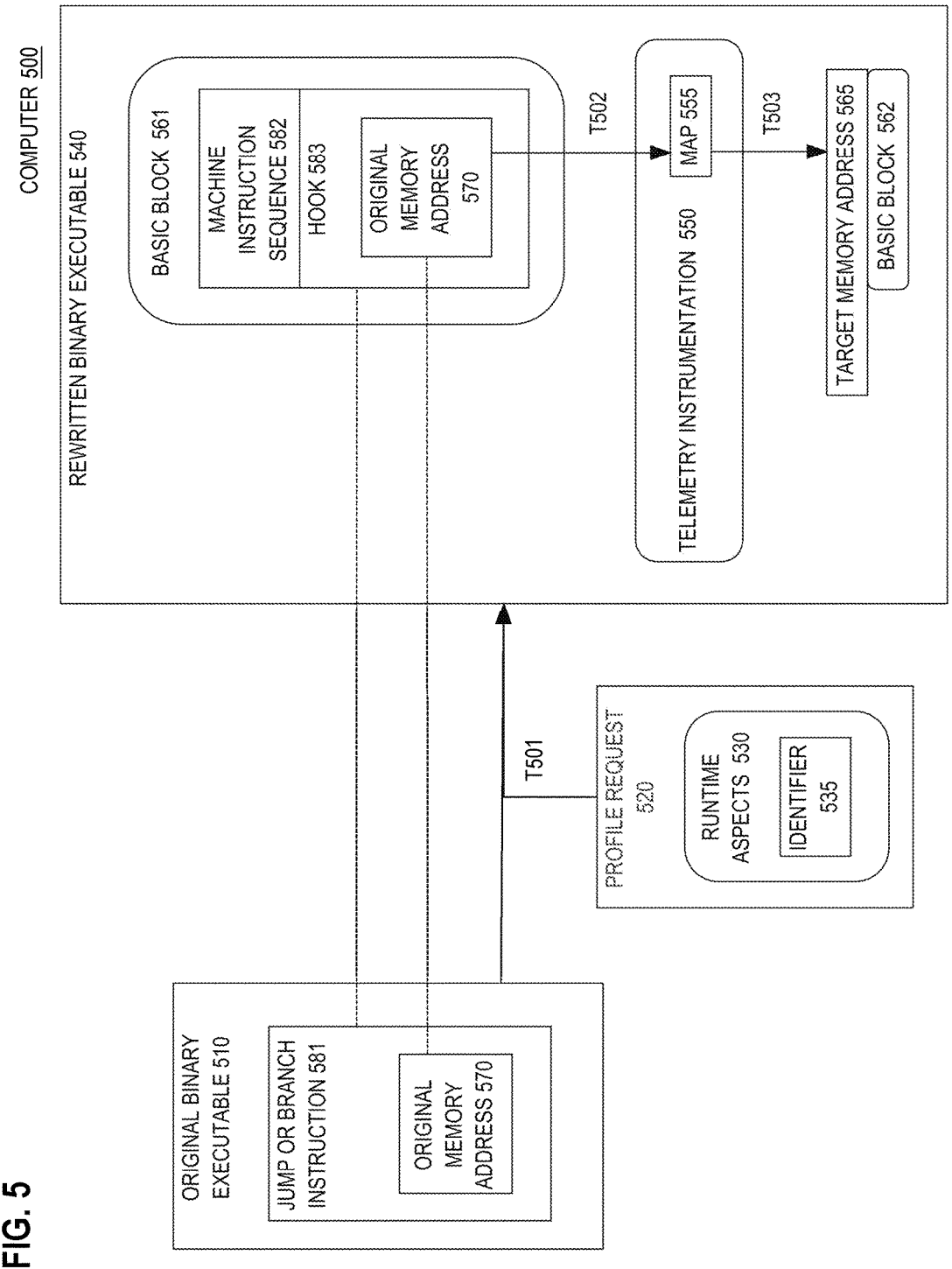
FIG. 5 is a block diagram that depicts an example computer that translates original memory addresses during emulation, in an embodiment.

FIG. 5 is a block diagram that depicts an example computer 500, in an embodiment. Computer 500 dynamically translates original memory addresses during emulation. Computer 500 may be an implementation of computer system 100.

A consequence of binary executable rewriting is that static objects, such as machine instructions and static data constants/variables, may be individually moved to different memory offsets from a base memory address. For example when multiple un-instrumented subroutines are contiguous in memory, they can remain contiguous even after instrumenting adds machine instructions to those subroutines. However, that instrumentation changes the memory addresses of those subroutines, and even changes the relative offsets of those subroutines from a same base address. Thus, there may be no same arithmetic adjustment that can be made to all of the memory pointers to those subroutines that can restore the accuracy of those pointers after instrumentation. In other words, instrumentation may make machine instructions difficult to relocate.

For example, jump or branch instruction 581 when executed would load original memory address 570 into a program counter (not shown) to cause execution of a different machine instruction sequence. For example, a loop may use jump or branch instruction 581 to cause iteration. However because instrumentation may insert machine instructions into various places of an instruction sequence, the memory offset of the loop may change, which may cause original memory address 570 to become invalid.

6.1 Address Translation

Thus, pointer adjustment by memory address translation may be needed, which may affect what instrumentation is added. For example at T501 in response to receiving profile request 520, rewritten binary executable 540 is generated from original binary executable 510. Runtime aspects 530 is configured to selectively cause instrumentation of particular instruction sequences based on identifiers, such as 535, of artifacts such as subroutines, libraries, or basic blocks. For example, identifier 535 may identify a subroutine.

During executable rewriting, a subroutine may be decomposed into basic blocks such as 561-562. Jump or branch instruction 581 may be replaced, during rewriting, with hook 583 that may be an instruction that invokes a subroutine within telemetry instrumentation 550. Hook 583 may retain original memory address 570 as an operand. At runtime during time T502 when hook 583 calls into telemetry instrumentation 550, map 555 may be used to translate original memory address 570 into target memory address 565. Map 505 may be a lookup table of key-value pairs having original memory addresses as keys and target memory addresses as values. In an embodiment, original memory address 570 is instead a handle or array offset that map 555 uses as a key.

At time T503, telemetry instrumentation 550 may load target memory address 565 into a program counter to transfer control from basic block 561 to 562. Due to dynamic address translation with map 555, basic block 562 may be seamlessly relocated (e.g. due to insertion of instrumentation instructions). Thus, a control flow graph of basic blocks (and a partial ordering based on that graph) may remain valid despite instrumentation insertion. If the transfer of control from basic block 561 to 562 is unconstrained by the partial ordering, then time T502 may be immediately followed by T503. However if the partial ordering requires, telemetry instrumentation may suspend the involved execution thread between times T502-T503 to preserve concurrency timing.

7.0 Self-Modifying Logic

Figure 6:
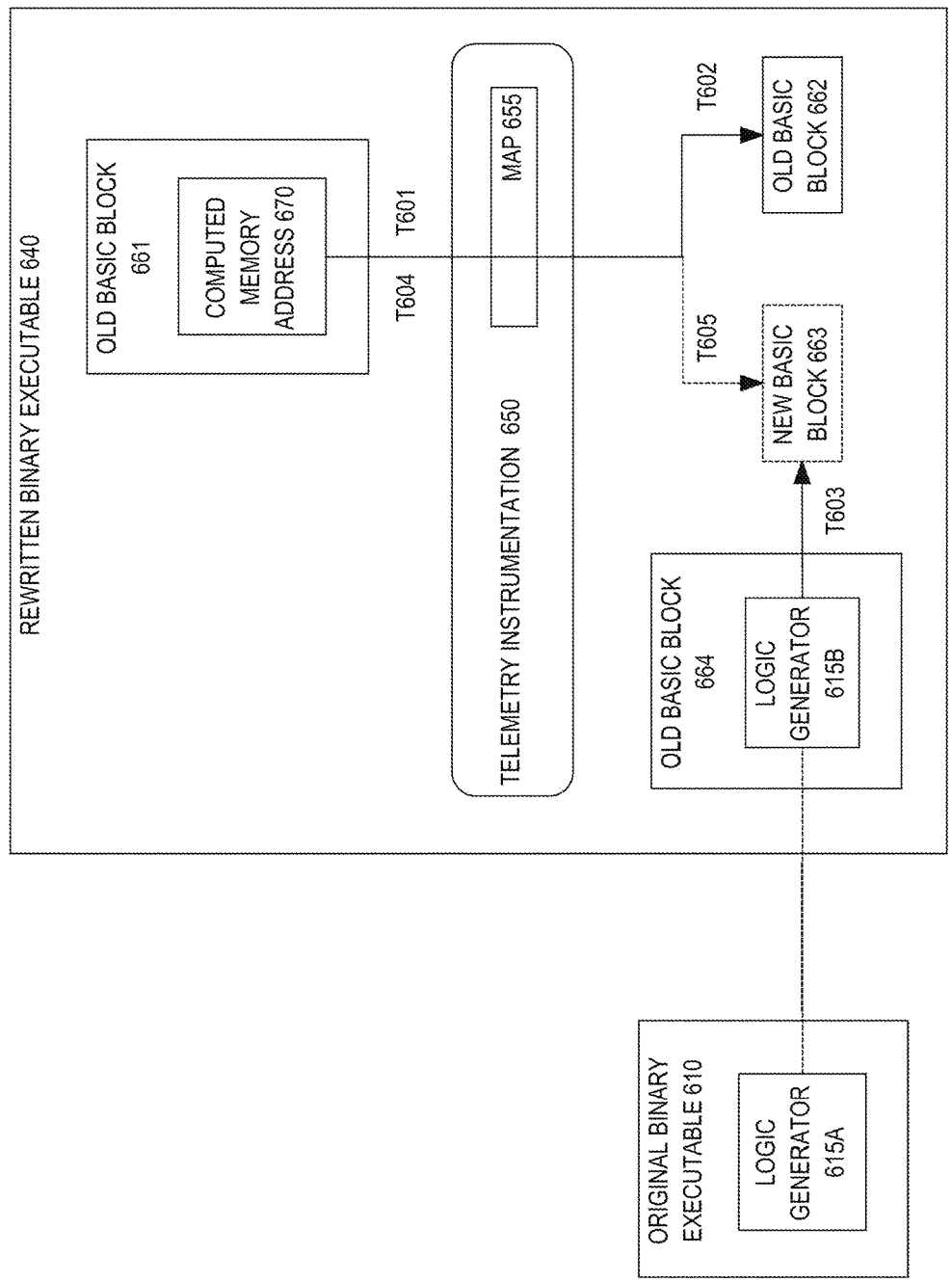
FIG. 6 is a block diagram that depicts an example computer that handles self-modifying logic, in an embodiment.

FIG. 6 is a block diagram that depicts an example computer 600, in an embodiment. Computer 600 handles self-modifying logic. Computer 600 may be an implementation of computer system 100.

Original binary executable 610 may contain self-modifying logic. For example, logic generator 615 may create new logic at runtime at time T603, such as a new basic block, such as 663. However, static instrumenting at link time or load time would not instrument new basic block 663 that does not exist at link time or load time. Thus, computer 600 may be configured to dynamically instrument new basic block 663 at runtime.

7.1 Computed Address

Telemetry instrumentation 650 may handle a control flow graph that changes during execution. For example, initial invocations of basic block 661 may transfer control to 662. Whereas, subsequent invocations of basic block 661 may transfer control to 663. For example, old basic block 661 may use computed memory address 670 to control which basic block immediately follows 661. For example, even original binary executable 610 may use a computed memory address such as 670. Thus, an algorithm to compute address 670 may be original to binary executable 610. Thus, the algorithm may compute address 670 in a way that does not expect (account for) relocation of a target basic block such as 662. Thus, even a dynamically computed address such as 670 may need additional translation by map 655.

For example at time T601, old basic block 661 may attempt to transfer control to old basic block 662 by computing and using memory address 670. At time T602, map 655 translates a current value of computed memory address 670 to the actual address of old basic block 662 and transfers control to 662 by jumping to that actual address.

Much later at time T603, logic generator 615B creates a new instruction sequence that includes new basic block 663 at an original address. Computer 600 may dynamically instrument the new instruction sequence, including new basic block 663, which relocates new basic block 663 from said original address to a new address. A new entry may be inserted into map 655 that associates said original address with said new address.

However, the address computation logic of old basic block 661 remains unchanged (and unaware that new basic block 663 is relocated). Thus at time T604 when old basic block 661 attempts to transfer control to new basic block 663, said original address is computed for memory address 670. Map 655 translates said original address to said new address. Thus at time T605, said new address can be loaded into the program counter, and control actually transfers to new basic block 663. In that way, computer 600 can accommodate self-modifying logic and an evolving control flow graph.

8.0 Embedded Device, Internet of Things

Figure 7:
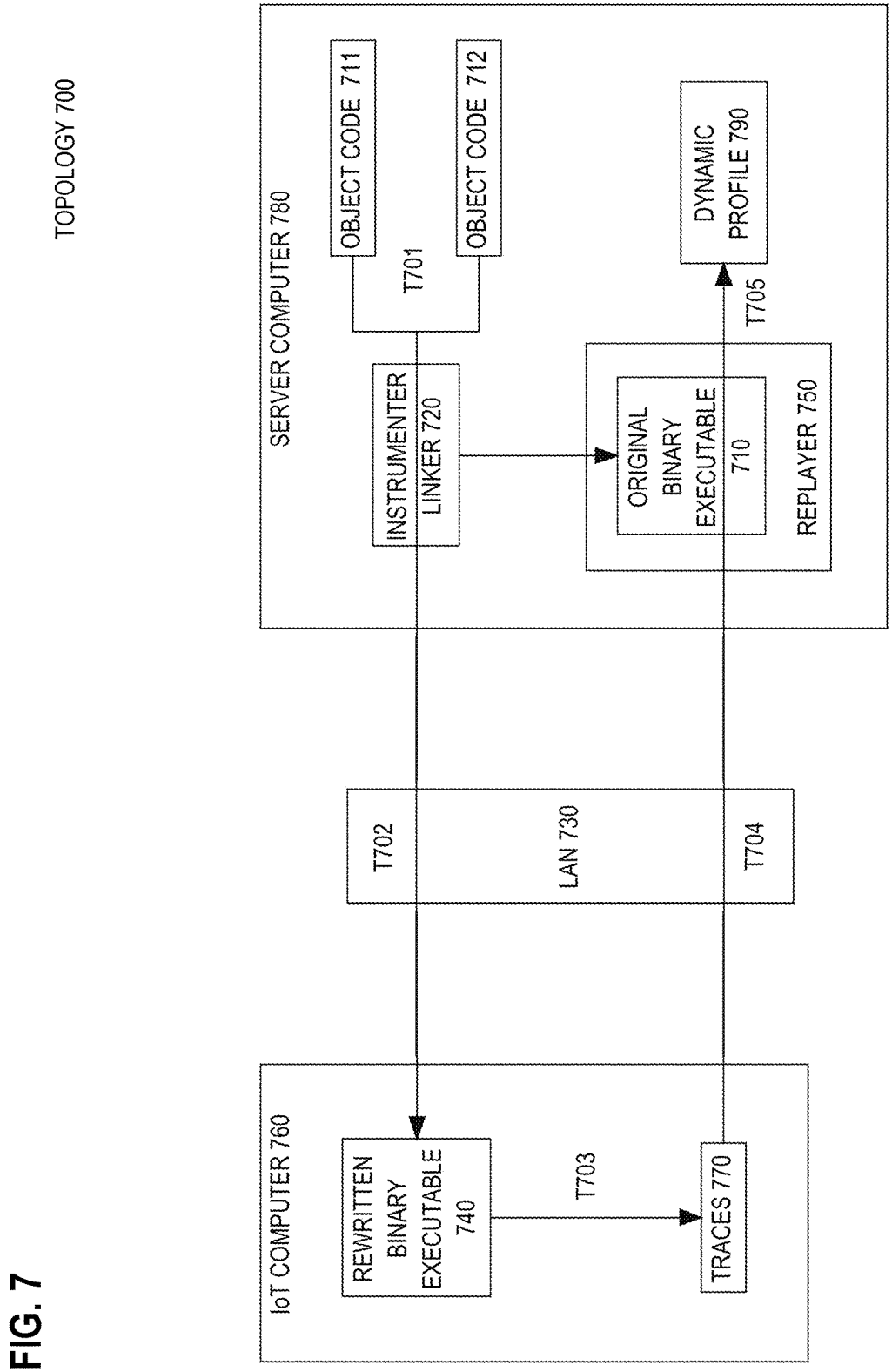
FIG. 7 is a block diagram that depicts an example laboratory network topology that has an embedded computer of constrained capacity that is typical of the internet of things (IoT), in an embodiment.

FIG. 7 is a block diagram that depicts an example laboratory network topology 700, in an embodiment. Topology 700 has an embedded computer of constrained capacity that is typical of the internet of things (IoT). Topology 700 may be an implementation of computer system 100.

For example, IoT computer 760 may have a constrained single-core uniprocessor. Thus, topology 700 should burden IoT computer 760 with as little responsibility as possible. Thus, IoT computer 760 performs a first of two executions of a binary executable and essentially does little else. Thus, IoT computer 760 has no ability to perform binary executable rewriting, no ability to perform an artificially partially ordered second execution of original binary executable 710, and no ability to create intensive dynamic profile 790. Thus, server computer 780 should perform binary executable rewriting to create rewritten binary executable 740.

For example at link time T701, instrumenter linker 720 links original object code modules such as 711-712 to create original binary executable 710, which is instrumented to create rewritten binary executable 740. At deployment time T702, instrumenter linker 720 sends rewritten binary executable 740 over local area network (LAN) 730. In an embodiment, IoT computer 760 burns rewritten binary executable 740 into flash or electrically erasable programable read only memory (EEPROM).

During a first runtime at time T703, IoT computer 760 performs a first execution with rewritten binary executable 740 and begins to generate traces 770. Also during the first runtime at telemetry time T704, rewritten binary executable 740 emits traces 770 to a network socket connected back to server computer 780. If traces 770 are unbuffered, then times T703-T704 are more or less simultaneous. In an embodiment, traces 770 are transmitted using user datagram protocol (UDP) for less control overhead.

Server computer 780 may receive traces 770 as a binary stream that is dense and continuous. In an embodiment, server computer 780 spools traces 770 into a file. In an embodiment, server computer 780 eventually loads traces 770 from the file into a relational database for analytics, such as with an extract, transfer, and load (ETL) tool. In another embodiment, server computer 780 records live traces 770 directly into a database that is capable of a high ingest rate, such as no structured query language (NoSQL) or a well-tuned Oracle database.

Regardless of persistence tooling, replayer 750 eventually consumes traces 770, derives a partial ordering from traces 770, and performs a partially ordered second execution with original binary executable 710 to generate intensive dynamic profile 790 at second runtime T705. In an embodiment with self-modifying logic, IoT computer 760 may use additional network round trips to delegate dynamic instrumentation of new logic to instrumenter linker 720. In these ways, dynamic profile 790 may be created even though IoT computer 760 has no capacity to do so.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
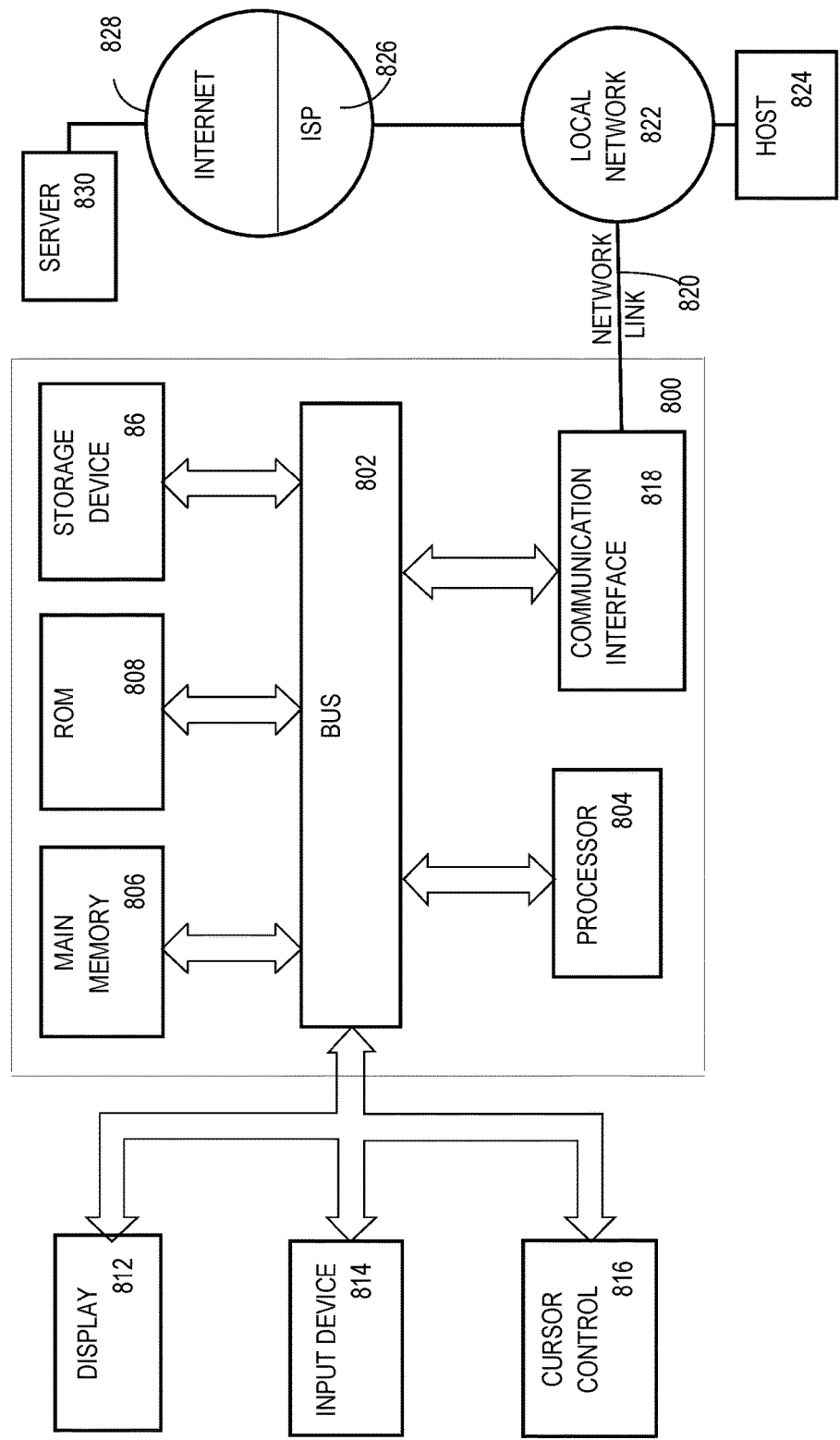
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 86, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 86. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 86. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 86 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 86, or other non-volatile storage for later execution.

10.0 Software Overview

Figure 9:
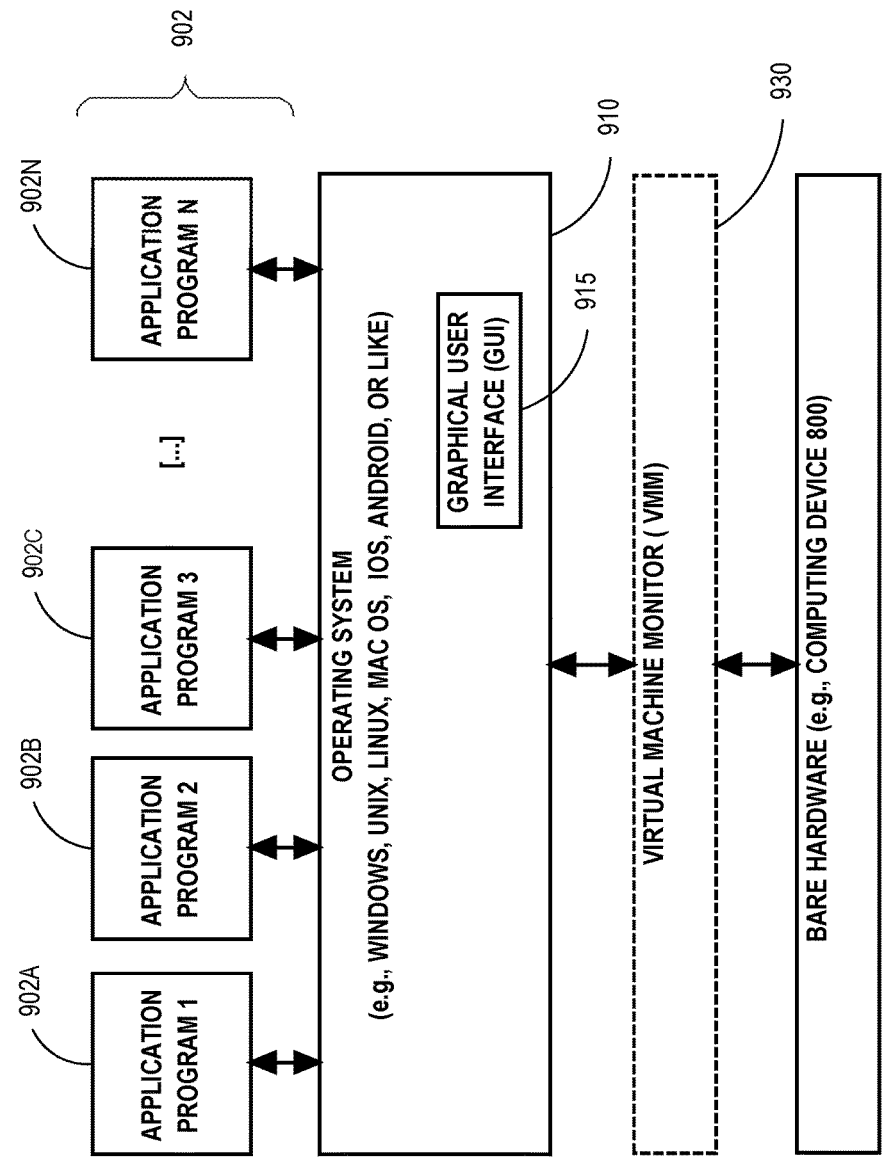
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 86, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 86 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

8.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a request to profile particular runtime aspects of an original binary executable that comprises: a) a first thread that comprises a first basic block and a second basic block, and b) a second thread that comprises a third basic block;
    statically rewriting, based on said particular runtime aspects and without accessing source logic, the original binary executable into a rewritten binary executable that: a) comprises the first thread and the second thread, and b) invokes telemetry instrumentation that makes performance observations and emits traces of said performance observations;
    first executing the rewritten binary executable on a first processing core to: a) make first performance observations of the first thread and the second thread, and b) emit first traces of said first performance observations;
    second executing, based on said first traces of said first performance observations of said first executing, the original binary executable on a second processing core that has more processing power than said first processing core;
    during the second executing and until execution of the third basic block by the second thread, suspending the first thread after execution of the first basic block and before execution of the second basic block;
    generating a dynamic performance profile based on said particular runtime aspects and said second executing the original binary executable.

2. The method of claim 1 wherein:
    said original binary executable can generate new logic when executed;
    said rewritten binary executable generates a new basic block when executed;
    the method further comprises dynamically rewriting said new basic block to invoke telemetry instrumentation.

3. The method of claim 1 wherein said processing power comprises at least one of: throughput, bandwidth, or clock speed.

4. The method of claim 1 wherein said first executing consumes less processing power than said second executing.

5. The method of claim 1 wherein said first processing core and said second processing core reside on a same chip or a same circuit board.

6. The method of claim 1 wherein a local area network (LAN) separates said first processing core from said second processing core.

7. The method of claim 1 wherein said particular runtime aspects comprise at least one of: dead logic that is not executed, and/or a memory leak.

8. The method of claim 1 wherein said second executing based on said first traces of said first performance observations of said first executing comprises suspending, based on said first traces of said first performance observations of said first executing, a thread.

9. The method of claim 1 wherein said original binary executable contains none of: debug information, or a symbol table.

10. The method of claim 1 wherein said statically rewriting occurs during linking said original binary executable.

11. The method of claim 1 wherein said first processing core does not perform said statically rewriting.

12. The method of claim 1 wherein statically rewriting comprises register scavenging.

13. The method of claim 1 wherein:
    said original binary executable contains a first machine instruction that jumps or branches to an original basic block that is identified by a first memory address;
    said rewritten binary executable contains a rewritten basic block that:
        corresponds to said original basic block,
        is identified by a second memory address, and
        contains a hook that:
            identifies said first memory address, and
            corresponds to said first machine instruction;
    said telemetry instrumentation:
        dynamically translates said first memory address to said second memory address, and
        transfers execution to said second memory address.

14. A method comprising:
    receiving a request to profile particular runtime aspects of an original binary executable;
    statically rewriting, based on said particular runtime aspects and without accessing source logic, the original binary executable into a rewritten binary executable that invokes telemetry instrumentation that makes performance observations and emits traces of said performance observations;

first executing the rewritten binary executable on a first processing core to make first performance observations and emit first traces of said first performance observations;

third executing, concurrent with said first executing, the rewritten binary executable on a third processing core having low power to make second performance observations and emit second traces of said second performance observations;

processing said first traces and said second traces to detect a partial ordering of said first performance observations and said second performance observations;

second executing, based on said first traces and said partial ordering, the original binary executable.

15. The method of claim 14 wherein:
said original binary executable comprises a first plurality of original basic blocks;
said rewritten binary executable comprises a second plurality of rewritten basic blocks;
each rewritten basic block of said second plurality of rewritten basic blocks corresponds to a respective original basic block of said first plurality of original basic blocks;
said rewritten binary executable that invokes telemetry instrumentation comprises said rewritten binary executable invokes said telemetry instrumentation in between execution of rewritten basic blocks of said second plurality of rewritten basic blocks.

16. The method of claim 15 wherein:
said first plurality of original basic blocks comprise:
 a first basic block for execution by a first thread, and
 a second basic block and a third basic block for execution in sequence by a second thread;
said second executing the original binary executable comprises, based on said partial ordering, not executing said third basic block until:
 said second basic block is fully executed, and
 said first basic block has at least partially executed.

17. One or more non-transitory computer-readable media storing instructions that, when executed by one or more processors, cause:
receiving a request to profile particular runtime aspects of an original binary executable that comprises: a) a first thread that comprises a first basic block and a second basic block, and b) a second thread that comprises a third basic block;
statically rewriting, based on said particular runtime aspects and without accessing source logic, the original binary executable into a rewritten binary executable that: a) comprises the first thread and the second thread, and b) invokes telemetry instrumentation that makes performance observations and emits traces of said performance observations;

first executing the rewritten binary executable on a first processing core to: a) make first performance observations of the first thread and the second thread, and b) emit first traces of said first performance observations;

second executing, based on said first traces of said first performance observations of said first executing, the original binary executable on a second processing core that has more processing power than said first processing core;

during the second executing and until execution of the third basic block by the second thread, suspending the first thread after execution of the first basic block and before execution of the second basic block;

generating a dynamic performance profile based on said particular runtime aspects and said second executing the original binary executable.

18. The one or more non-transitory computer-readable media of claim 17 wherein:
the instructions further cause third executing, concurrent with said first executing, the rewritten binary executable on a third processing core having low power to make second performance observations and emit second traces of said second performance observations;
processing said first traces comprises processing said second traces to detect a partial ordering of said first performance observations and said second performance observations;
said second executing the original binary executable is based on said partial ordering.

19. The one or more non-transitory computer-readable media of claim 17 wherein:
said original binary executable can generate new logic when executed;
said rewritten binary executable generates a new basic block when executed;
the instructions further cause dynamically rewriting said new basic block to invoke telemetry instrumentation.

20. The one or more non-transitory computer-readable media of claim 17 wherein:
said original binary executable contains a first machine instruction that jumps or branches to an original basic block that is identified by a first memory address;
said rewritten binary executable contains a rewritten basic block that:
 corresponds to said original basic block,
 is identified by a second memory address, and
 contains a hook that:
  identifies said first memory address, and
  corresponds to said first machine instruction;
said telemetry instrumentation:
 dynamically translates said first memory address to said second memory address, and
 transfers execution to said second memory address.

* * * * *